(12) United States Patent
Slik et al.

(10) Patent No.: US 7,899,850 B2
(45) Date of Patent: Mar. 1, 2011

(54) RELATIONAL OBJECTS FOR THE OPTIMIZED MANAGEMENT OF FIXED-CONTENT STORAGE SYSTEMS

(75) Inventors: David Slik, Burnaby (CA); Oliver Seiler, New Westminster (CA); Mike Montour, Vancouver (CA)

(73) Assignee: Bycast, Inc., Vancouver (CA)

( * ) Notice: Subject to any disclaimer, the term of this patent is extended or adjusted under 35 U.S.C. 154(b) by 448 days.

(21) Appl. No.: 12/036,162

(22) Filed: Feb. 22, 2008

(65) Prior Publication Data

US 2009/0216796 A1    Aug. 27, 2009

(51) Int. Cl.
   *G06F 17/30* (2006.01)
   *G06F 7/00* (2006.01)
(52) U.S. Cl. .................................. 707/822; 707/823
(58) Field of Classification Search .................. 707/511, 707/530, 100, 101, 822, 823; 705/27
   See application file for complete search history.

(56) References Cited

U.S. PATENT DOCUMENTS

| | | | |
|---|---|---|---|
| 3,721,757 A | 3/1973 | Ettlinger | |
| 5,634,052 A | 5/1997 | Morris | |
| 6,976,165 B1 | 12/2005 | Carpentier et al. | |
| 7,028,071 B1 | 4/2006 | Slik | |
| 7,143,251 B1 | 11/2006 | Patterson | |
| 2002/0133515 A1* | 9/2002 | Kagle et al. | 707/511 |
| 2006/0190358 A1* | 8/2006 | Slik | 705/27 |
| 2008/0235247 A1* | 9/2008 | Krantz et al. | 707/100 |

* cited by examiner

*Primary Examiner* — Charles Rones
*Assistant Examiner* — Fariborz Khoshnoodi
(74) *Attorney, Agent, or Firm* — Knobbe, Martens, Olson & Bear, LLP

(57) ABSTRACT

A system and method is described for managing data objects in a fixed-content storage system. Metadata is provided for each variable size packet and may include offset information, packet size data, reference content blocks, and the like. Using this information, intelligently decomposed objects, consolidated objects, differenced objects, and composite objects may be stored in the storage system. The data structure provided by these objects allows for the reduction of necessary storage resources and the total number of stored objects.

16 Claims, 12 Drawing Sheets

RELATIONAL OBJECTS FOR THE OPTIMIZED MANAGEMENT OF FIXED-CONTENT STORAGE SYSTEMS

TECHNICAL FIELD

The present invention relates to fixed-content storage systems. In particular, the present invention relates to managing data objects in a fixed-content storage system.

BACKGROUND

A fixed-content object is a container of digital information that, once created, remains fixed. Examples of objects that could be fixed include medical images, PDF documents, photographs, document images, static documents, financial records, e-mail, audio, and video. Altering a fixed-content object results in the creation of a new fixed-content object. A fixed-content object once stored becomes immutable.

Fixed-content digital data is often subject to regulatory requirements for availability, confidentiality, integrity, and retention over a period of many years. As such, fixed-content data stores grow without bounds and storage of these digital assets over long periods of time presents significant logistical and economic challenges.

To address the economic and logistical challenges associated with storing an ever growing volume of information for long periods of time, fixed-content storage systems implement a multi-tier storage hierarchy and apply Information Lifecycle Management (ILM) policies that determine the number of copies of each object, the location of each object, and the storage tier for each object. These policies will vary based on the content of each object, age of each object, and the relevance of the object to the business processes.

A multi-site, multi-tier storage system, large scale distributed fixed-content storage is needed, for example, to address the requirement for storing multiple billions of fixed-content data objects. These systems ensure the integrity, availability, and authenticity of stored objects while ensuring the enforcement of Information Lifecycle Management and regulatory policies. Examples of regulatory policies include retention times and version control.

SUMMARY

Fixed-content storage systems grow as new objects are stored. This growth is accelerated by providing redundant copies of fixed-content objects in order to reduce the probability of data loss. As the size and complexity of the fixed-content storage system grow, the resources necessary to manage the storage system also increase. Improved data management techniques are therefore needed as the system scales to more efficiently store, organize, and manage data in a fixed-content storage system, while also fulfilling applicable regulations.

In one embodiment, a data object to be stored in a distributed fixed-content storage system is intelligently decomposed along the data object's logical boundaries. Intelligently decomposed objects are compared with other reference objects and, where they are identical, one reference object is stored and referenced by a reference content block. For example, a medical study archive contains thousands of instances of a template form with minor variations. For each instance, the template is stored separately from the additional data. Intelligent decomposition of the template data and the additional data when storing the archive allows for one instance of the template data to be referenced by other objects containing reference content blocks. Thus, storage resources may be used efficiently where identical data is stored in only as many places as required by regulatory or other requirements.

In another embodiment, multiple external data objects are consolidated into a single data object. The external data objects are accessed by reference to metadata that indicates an offset and size of the external data object. By consolidating many objects into a single object, the total number of data objects is reduced. This allows for the simplified management of the data stored in the fixed-content storage system.

In another embodiment, differenced objects are created when an object stored in a fixed-content storage system is edited. The edits to the original object may represent a small change in the original object, but because the stored original object is immutable it is not possible to simply overwrite the small portion that is edited. In order to store the edited data without requiring duplication of existing data, a new object is created that references both the original object and the edited data. The metadata of the new object includes information relating to the offset and the size of the edited data so that the edited data is accessed instead of the corresponding portion of the original object.

In yet another embodiment, composite objects are provided that reference multiple objects. A manifest data object is created that references each object, and accessing the manifest data object allows for the identification, access, and management of objects joined in the composite object.

DETAILED DESCRIPTION

Continued adoption of digital technology in nearly all sectors including healthcare, media, government, and financial services is accelerating the creation of fixed-content data. Regulatory and business requirements for retention are resulting in the continued growth of data that must be stored and managed. In many sectors, the retention times exceed the practical lifetime of the storage media, and long term data archiving is an ongoing business challenge. As the archives grow, scaling limitations arise due to the size of the stored data as well as the number of fixed content objects that need to be stored and managed. There is a market demand for fixed-content storage systems that can intelligently manage fixed-content data to provide for more efficient scaling.

Fixed-content storage involves the storage and management of data such that once stored, the data is immutable—it cannot be changed. Thus, locks are not required for alterations to the contents of the object. However, despite the object itself being immutable, additional objects may be stored that consist of minor variations of an existing object and many objects may have large amounts of identical data. Efficiency is provided according to certain embodiments by recognizing where these minor variations and duplicate data exist. Rather than providing more copies of any particular data than necessary, metadata is configured to provide references to data objects containing the data. Additionally, object management may be simplified by reducing the total number of objects or providing a single object that allows access to and management of additional objects.

Storage Grid Overview

Figure 1:
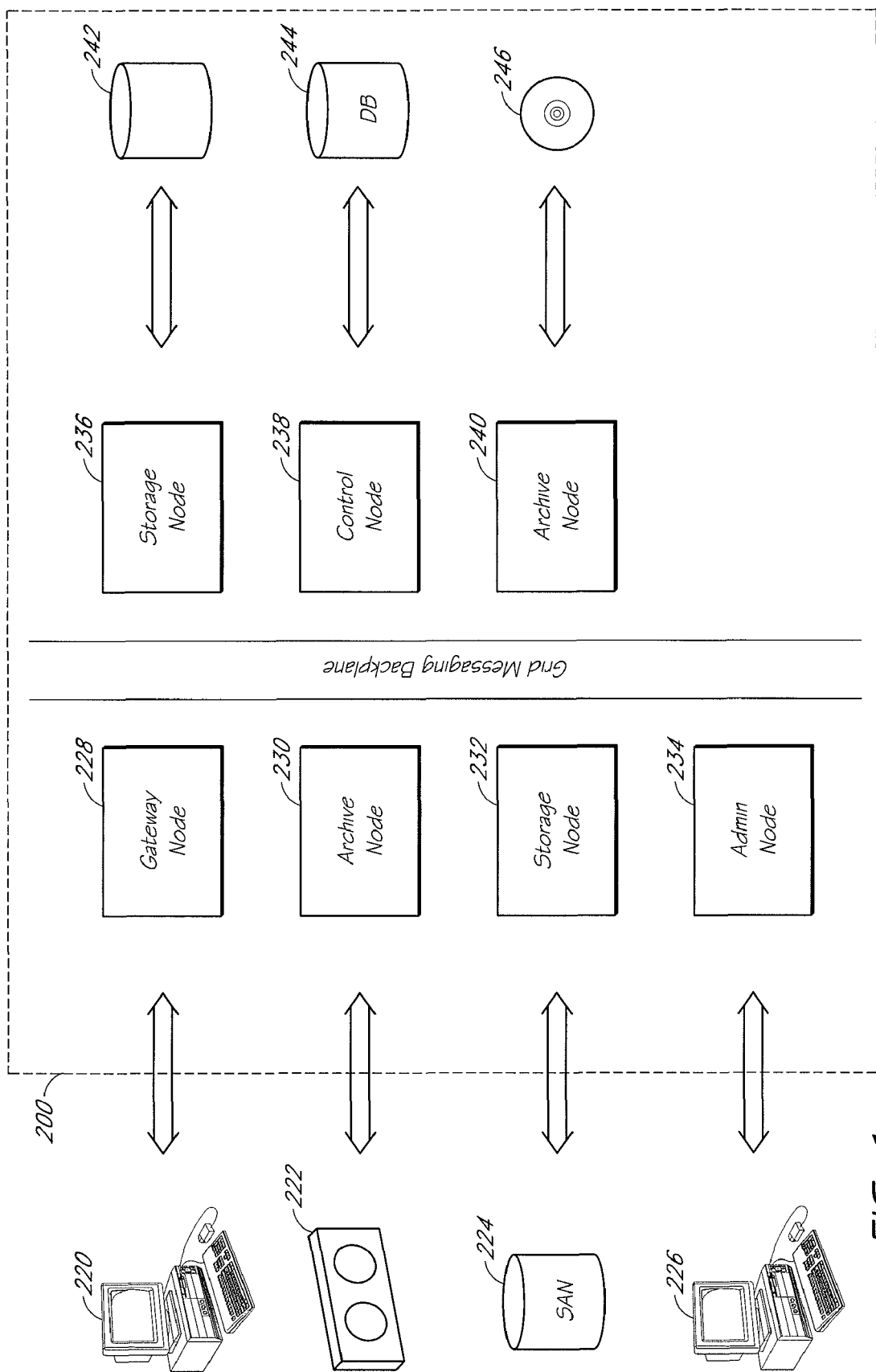
FIG. 1 illustrates various nodes in a distributed storage system.

As illustrated in FIG. 1, a typical fixed-content storage system deployment may involve multiple nodes, often spanning multiple geographically separated sites. When a request for information is made, the storage grid 200 may serve that request based on the location of the data, the location of the user, the load on the system, and the state of the network. This balances the load on the network, storage and servers in order to minimize bandwidth usage and increase performance. The storage grid 200 is a unified structure, but there may be multiple servers or repositories of content or metadata.

Nodes may be grouped based on the services they provide. For example, storage nodes 232, 236 may provide for secure data storage and transmission. A storage node may consist of a service running on a computing resource that manages storage and archival media such as a spinning media resource or tape.

The storage resource 224, 242 on a storage node can be based on any storage technology, such as RAID, NAS, SAN, or JBOD. Furthermore, this resource may be based on any grade of disk such as a high performance fiber channel or ATA disk. Storage nodes may be linked together over, for example, LAN and WAN network links of differing bandwidth.

Storage nodes can accept data and process retrieval requests, and information input into a storage node can be retrieved from other storage nodes. Storage nodes may process client protocol requests and include support for DICOM, HTTP and RTP/RTSP. Support for NFS/CIFS may be provided, for example, through gateway nodes.

Storage nodes may replicate and cache data across multiple sites and multiple nodes. Data replication is based on a set of configurable rules that are applied to the object metadata and may take into account geographic separation of nodes as well as the bandwidth between nodes. The logic that governs replication and distribution may be enforced by control nodes.

Gateway nodes 228 provide an interface through which external applications 220 may communicate with the storage grid. Gateway nodes 228 route incoming requests to storage nodes based on, for example, the available CPU, bandwidth, storage and geographic proximately. For applications that require direct file system access, the gateway nodes 228 may provide a NFS/CIFS interface to the storage grid.

Control nodes 238 may consist of separate software services, such as the Content Metadata Service (CMS) and the Administrative Domain Controller (ADC). Although these services can run on separate computing resources, they may also share a single server. The Content Metadata Service constitutes a distributed business rules engine that provides for content metadata storage, metadata synchronization, metadata query and enforcement of replication and information lifecycle management business logic. Replication and information lifecycle management policies may be based on metadata that is associated with stored objects. This allows the creation of business rules that determine where content is stored, how many copies are stored, and on what media it is stored on throughout its lifecycle. A Content Metadata Service may interface, for example, with a local SQL database through a database abstraction layer.

The Administrative Domain Controller acts as a trusted authentication repository for node-to-node communication. It also provides knowledge of system topology and information to optimize real-time usage of bandwidth, CPU and storage resources. This allows automated management of computational resources and dynamic load balancing of requests based on the available CPU, storage and bandwidth resources.

The Administration Node 234 may consist of software components such as the Network Management Service and the Audit Service. These services may share a common computing resource, or they may be run on separate computing resources. A management interface 226 may be used to monitor and manage the operational status of the grid and associated services.

The Audit Service provides for the secure and reliable delivery and storage of audited events corresponding to content transactions across the entire storage grid. Audit events are generated, in real-time, by Storage Nodes and Control Nodes. Events are then relayed through the storage grid using a reliable transport mechanism and delivered to the Administration Nodes. Audit messages are processed by the Audit Service and may be directed to an external database or file.

The Network Management Service collects and processes real-time metrics on utilization of computing, storage and bandwidth resources. It provides real-time and historical usage reports. In addition it is responsible for fault reporting and configuration management.

The Archive Node 230, 240 may manage a locally attached tape drive or library 246 for the archiving and retrieval of grid managed objects. Archive nodes may be added to diversify archive pools and to provide archival storage at multiple sites. The storage grid 200 may also utilize external storage resources, such as a managed tape library 222 or an enterprise SAN 224.

Storage Nodes and Control Nodes in the storage grid can be upgraded, decommissioned, replaced or temporarily disconnected without any disruption. Nodes do not need to run on the same hardware or have the same storage capacity. Nodes replicate and cache data across multiple sites and multiple nodes. In addition to bandwidth savings, the intelligent distribution of information provides for real-time backup, automated disaster recovery and increased reliability.

Capacity, performance and geographic footprint of the storage grid can be increased by adding nodes as needed, when needed, without impacting end-users. This enables the storage grid to accommodate thousands of terabytes of data across hundreds of locations. The storage grid combines the power of multiple computers to achieve extremely high levels of scalability and throughput. As nodes are added to the storage grid, they contribute to the available computational and storage resources. These resources are seamlessly utilized based on bandwidth availability and geographical suitability.

In traditional archives, information is stored as files, and access to data is gained through a path pointer stored in an external database. When storage scales, old storage is replaced, or is offline, this results in broken pointers and unavailable data. In order to scale, costly and disruptive migration procedures are required. Furthermore, it is difficult to operate in heterogeneous environments and multi-site deployments. This is because the approach relies on the underlying file system and network file system protocols.

Within the storage grid, data are stored and referenced as objects. An object can be one file or a collection of files with relationships that are defined by object metadata. Object metadata constitutes application specific information that is associated with a data object. This information can be attached to or extracted from the object at the time of input into the storage grid. Object metadata can be queried and the storage grid can enforce business rules based on this information. This allows for efficient utilization of storage/bandwidth resources, and enforcement of storage management policies.

In this object oriented architecture, external applications no longer use pointers to a path, but a universal handle to an object. This enables high levels of reliability, scalability and efficient data management without the need for disruptive migration processes. Multiple object classes can be defined and for each object class, there are specific business rules that determine the storage management strategy.

In this embodiment, the storage grid is fault tolerant, resilient and self-healing. Transactions continue to be processed even after multiple hardware, storage and network failures. The design philosophy is that hardware, network, and catastrophic failures will occur, and the system should be able to deal with faults in an automated manner without impacting the stored data or end-users.

Reliability is achieved through replicas, which are identical copies of objects (both data and metadata) that are stored on multiple nodes and kept synchronized. Increasing reliability involves adding nodes to the storage grid and increasing the number of replicas for each object. The location and number of the replicas is based on a set of rules that can be configured to ensure geographical separation and the desired level of redundancy. The storage grid will automatically enforce this logic across all nodes. If a failure is detected, the system is self-healing in that additional replicas are automatically created to restore the level of resiliency.

As nodes are added, removed or replaced, the system manages the available storage. Incoming data is transparently re-directed to the take advantage of the newly added storage capacity. Within the storage grid objects are redistributed, purged, or replicated based on metadata and policies that are applied to the metadata. Objects can also migrate from one storage grade (e.g., disk) to another (e.g., tape) not simply based on time and date stamps, but external metadata that indicates the importance of the object to the specific business application. For example in medical applications, certain imaging exams may be immediately committed to deep storage. In applications for the financial sector, retention policies may be set up to facilitate compliance with regulatory requirements for data retention.

Users may input and retrieve data from the location within the storage grid that is closest to them, thereby efficiently utilizing bandwidth and reducing latency. In addition, as information is requested, it may be cached at the requesting Storage Node to enable improved bandwidth efficiency.

Obsolete components can be removed without impacting services or endangering stability and reliability. A Storage Node may be decommissioned through the administrative console. When this takes place, the storage grid may automatically redirect requests to alternate nodes. Furthermore, the storage grid may transparently re-distribute the stored data on other suitable Storage Nodes. This allows for seamless removal of obsolete hardware without any disruptions to storage grid operations. This is in contrast to disruptive data migration procedures that are common in many fixed content applications. Operators can eliminate support for obsolete hardware while taking advantage of the economic benefits of decreasing costs of storage and increases in processing power. Each newly added node costs less and provides more processing power and storage capacity.

When data and metadata are stored into the storage grid, the data and metadata is packaged into an object. Objects consist of data and associated metadata that are managed as an unalterable and atomic entity. Once stored, these objects are actively managed throughout their information lifecycle. When an object is retrieved, the original data and associated metadata is presented for use. This provides a transparent storage service to external entities.

Each object stored may have a unique identifier that acts as the primary identifier for the object. This identifier may be assigned at the time the object is created. Objects can be moved from one object store to another.

Objects stored within the grid may contain metadata, which is used to manage the objects over their lifecycle and facilitate access to the objects. Object metadata may include, for example, Content Block metadata, Protocol metadata, Content metadata, User metadata, or Management metadata.

Content Block metadata may be metadata associated with the object creation process itself, and provides information about the packaging and protection of the user provided data and metadata. An example of this type of metadata is the size of the data stored in a given object.

Protocol metadata may be metadata associated with the protocol used to store the object, but not intrinsic to the data within the object. This includes metadata required to perform protocol specific transactions. For data stored through the DICOM protocol, an example of this type of metadata is the DICOM AE title of the entity that stored the data.

Content metadata may include metadata contained within recognized types of content. If so processed, metadata specific to each recognized type of content is extracted from the content. For content of type PDF, an example of this type of metadata is the number of pages in a document.

User metadata may include arbitrary metadata specified by the entity storing content into the grid. This ability to attach user metadata is limited by the protocol used to store the objects. An example of this type of metadata is a private identifier assigned by the user.

Management metadata consists of metadata generated and modified over time as objects are managed within the grid. Unlike the previous four classes of metadata, this metadata is not immutable, and is not present as part of the object itself. An example of this type of metadata is the time when an object was last accessed.

Each time a new object is stored, the metadata associated with the object is also stored in a separate subsystem that maintains a repository of metadata. The metadata store can be queried to return the metadata associated with a given object. Queries can also be performed to return a list of objects and requested metadata for all objects that have metadata that matches a specific query.

Placement of objects may be based on the capabilities of the storage grid computing resources. Different computing resources have different capacity to perform work. While this is primarily measured based on the clock frequency of the processor, the number of processors and relative efficiencies of different processor families may also be taken into account. In addition, the amount of CPU resources that are currently in use provides a mechanism to determine how "busy" a given resource is. These characteristics are monitored and measured to allow decisions to be made within the grid about which computing resource is best suited to use to perform a given task.

Placement of objects may also be based on the characteristics of the storage resources, such as storage latency, reliability, and cost. Storage capacity provides information for calculating risk in the event of rebuild. A measurement of the amount of storage capacity that is currently in use provides a mechanism to determine how full a given storage resource is, and determine which locations are more able to handle the storage or migration of new content. Different storage resources have different throughput. For example, high performance Fiber-Channel RAID systems will deliver better performance then a lower performance software RAID on IDE drives. A measurement of the amount of I/O bandwidth that is currently in use provides a mechanism to determine the extent to which a given storage resource is able to handle additional transactions, and how much it will slow down current transactions. Storage resources can be read-only, and thus not a candidate for the storage of new objects. These characteristics may be monitored and measured to allow decisions to be made within the grid about which storage resource is best suited to use to retain objects over time, and influence the rules that determine where objects should be stored.

Placement of objects may also consider the characteristics of network paths, such as latency, reliability and cost. Different network paths have different amounts of bandwidth available. This directly maps into the time required to transfer objects from one storage repository to another. The amount of the network bandwidth that is currently in use may also be considered. This provides a mechanism to determine how "busy" a given network link is, and to compare the expected performance as compared to the theoretical performance. These characteristics may be monitored and measured to allow decisions to be made within the grid about which network path is best suited to use to transfer objects through the grid.

When objects are stored in multiple different locations, the probability of data loss is reduced. By taking common-mode failure relationships and fault probability information into account, the probability of data loss and data inaccessibility for a given placement of objects can be quantified and reduced to manageable levels based on the value of the data in question.

To avoid common mode failures, replicas of objects can be placed in separate failure zones. For example, two replicas created within a single server room can take into account that storage on nodes that do not share a single UPS has a higher probability of accessibility then two replicas stored on two nodes that share the same UPS. On a larger scale, two replicas created in geographically distant locations have a lower probability of loss then two nodes within the same facility.

As replica placement rules are metadata driven, they can be influenced by external systems and can change over time. Changes to existing replicas and changes to the topology of the grid can also influence replica placement rules.

Replica placement can reflect the instantaneous, historical and predictive information associated with a given resource. For example, monitoring of server and storage health can dynamically influence the degree of reliability attributed to a given resource. Different types of storage resources, such as IDE vs. SCSI, have different reliability characteristics. In addition, archival and offline storage often have a distinct media lifetime, which need to be managed to preserve archive integrity. These are both examples of the use of information about available resources is used to determine the best solution for a given set of constraints.

Implementation of configuration information based on formal risk analysis can further optimize the resource tradeoff by providing information about common mode failures that cannot be automatically discovered by the grid. For example, the placement of two replicas on nodes situated along the same fault line may be considered to be within a common failure mode, and thus suboptimal when compared to the placement of one of the replica in a facility not located on the fault.

The use of external data feeds can provide valuable information about changes in the reliability of a given failure zone. In one scenario, a live feed from the weather monitoring system can provide advance notice of extreme weather events, which could allow the grid to dynamically rebalance content to reduce the risks associated with the loss of connectivity to a given facility.

Content stored in a fixed-content storage system can be, but is not limited to, audio, video, data, graphics, text and multimedia information. The content is preferably transmitted via a distribution system which can be a communications network including, but not limited to, direct network connections, server-based environments, telephone networks, the Internet, intranets, local area networks (LAN), wide area networks (WAN), the WWW or other webs, transfers of content via storage devices, coaxial cable, power distribution lines (e.g., either residential or commercial power lines), fiber optics, among other paths (e.g., physical paths and wireless paths). For example, content can be sent via satellite or other wireless path, as well as wireline communications networks, or on the same path as a unit of power provided by a utility company.

Reference Blocks

According to some embodiments, novel data structures are utilized in order to allow certain features described herein. Objects stored within the storage system are stored as one or more packets. Each packet includes a certain non-zero amount of packet metadata and zero or more bytes of payload data. In a preferred embodiment, the quantity of packet metadata and the quantity of payload data vary among different packets. A maximum packet size or quantity of payload data may be utilized. For example, the maximum quantity of payload data in a variable size packet may be configured to be 16 KB. Each packet may include a predetermined identical amount of packet metadata and payload data in some embodiments.

The packet metadata may contain information allowing for the processing of variable sized packets when the amount of packet metadata and payload data is not predefined. Types of packet metadata include offset data, packet size data, and the like. This packet metadata may allow for the arbitrary retrieval of data in an object by identifying a specific packet or bytes within or across one or more packets.

Figure 2:
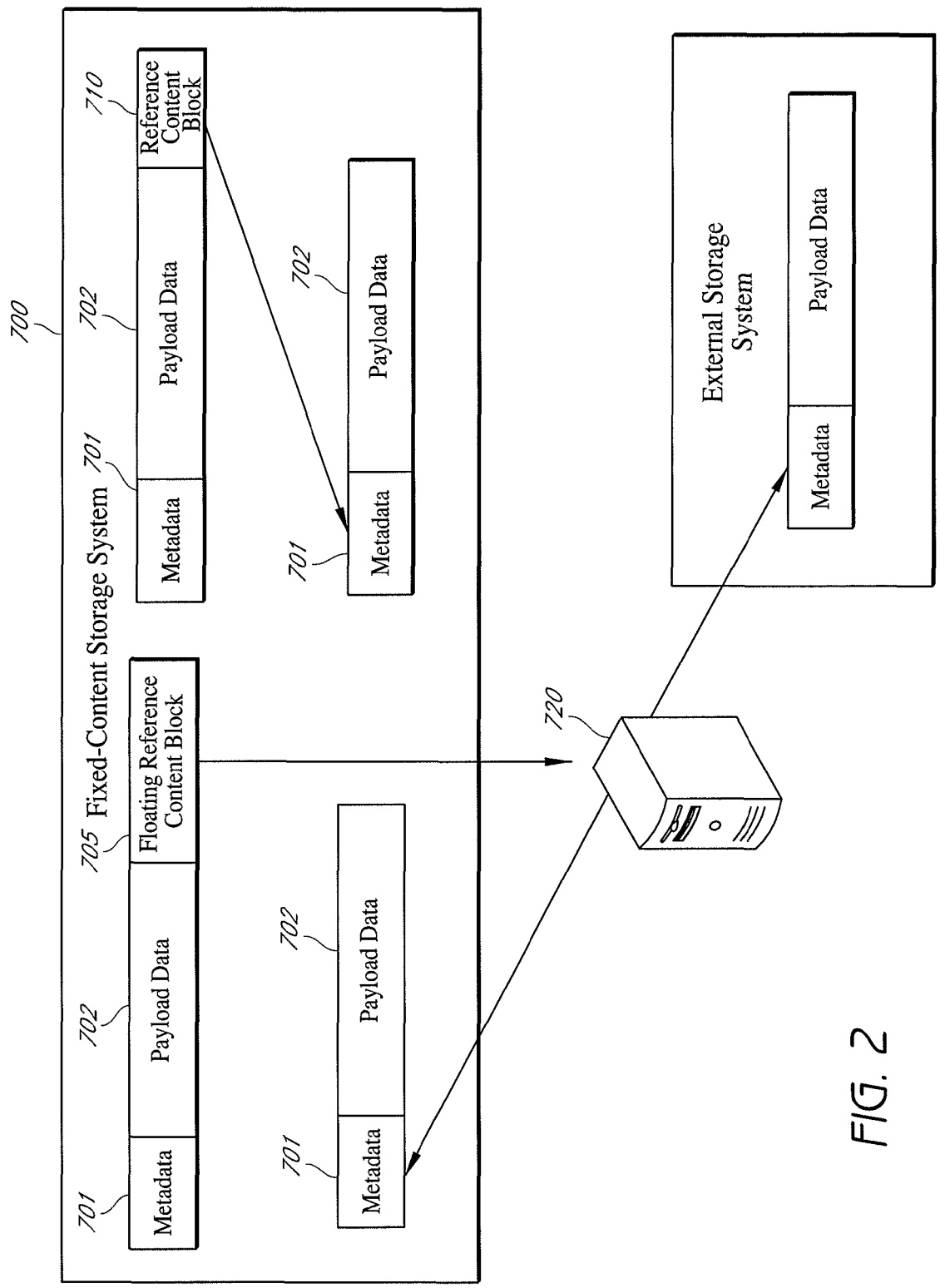
FIG. 2 illustrates an embodiment of a fixed-content storage subsystem that comprises multiple data objects.

FIG. 2 shows an embodiment of a fixed-content storage subsystem 700 that comprises multiple data objects. The data objects comprise metadata 701 and payload data 702. Furthermore, the fixed-content storage system 700 is accessible by a remote server 720.

As shown in FIG. 2, one or more packets may comprise reference content blocks 710 and/or floating reference content blocks 705 according to some embodiments. A reference content block 710 preferably has only packet metadata that refers to a different packet or content block, and does not contain any payload data. The packet metadata reference may cause an application accessing the reference content block to access some other packet(s) in place of the reference content block. For example, with a video file stored in a fixed-content storage system, a reference content block may be stored rather than another short video (such as a geographically specific clip). The reference content block may refer to that short clip stored separately, either in the fixed-content system or in another storage system.

A floating reference content block 705 is a reference content block that does not yet point to a packet or reference content block. Unlike reference content blocks 710, which are resolved at the storage system 700 (for example, by referring to a logical or physical memory address, or by referring to a particular object or instance), floating reference content blocks 705 are resolved at a server 720 or computing system outside the fixed-content storage system when the data is accessed. The packet metadata associated with the floating reference content block 705 specifies the size, duration, and/or other information that enables the server 720 to resolve the floating reference content block 705. Accordingly, an object comprising one or more packets may reference other objects or portions of other objects within the storage system 700. According to some embodiments and as shown in FIG. 2, a server 720 resolving a floating reference content block 705 may also resolve the storage location to an external storage system 730.

With floating reference content blocks, an object may reference variable data within the storage system. Though the data written to the fixed-content storage system 700 is not altered, floating reference content blocks 705 allow for the modification of an object as seen by an external user accessing the storage system 700. Floating reference content blocks may therefore be a powerful tool when used with a fixed-content storage system as described herein.

For example, if a medical report/form template is stored in a fixed-content storage system, there may be a number of blank fields. For each patient having a report stored, the values of these fields may be different, but the template is largely the same. If these fields are stored as floating reference content blocks, then the patient data may be stored separately for each patient, without duplicating the template data. When the data is accessed, for example by a medical professional, they may request information on one of the patients. The template would be loaded, and based on the patient information requested, the medical professional's computing system can resolve the floating reference content blocks in order to access the specific patient data requested along with the report form.

Floating reference content blocks may be resolved according to any criteria appropriate to the particular file. For example, a floating reference content block may be resolved based on the geographic location of the computing system accessing the data, an IP address, data submitted by the computing system, or the like.

The metadata in a reference content block or a floating reference content block can override some of the metadata in a packet (or group of packets) that is pointed to. This may allow certain data stored in the fixed-content storage system to be treated differently according to how it is accessed. This in turn may allow for objects to be stored once rather than requiring near identical copies, as the data is immutable. By changing the management rules of the fixed-content storage system, more flexibility is obtained without modifying the protected data. Several embodiments of operations performed using reference content blocks and floating reference content blocks will be described in more detail below.

Intelligent Decomposition

FIGS. 2A-E demonstrate a method for intelligently decomposing data stored in a fixed-content storage system according to one embodiment. Intelligent decomposition stores data objects according to their logical boundaries and allows for single instance storage of objects or portions of objects that may be identical. For example, in some systems multiple instances of similar data are stored, where the difference is the payload within a well-known structure, such as a TAR archive. A TAR archive is the concatenation of one or more files.

Figure 2A:
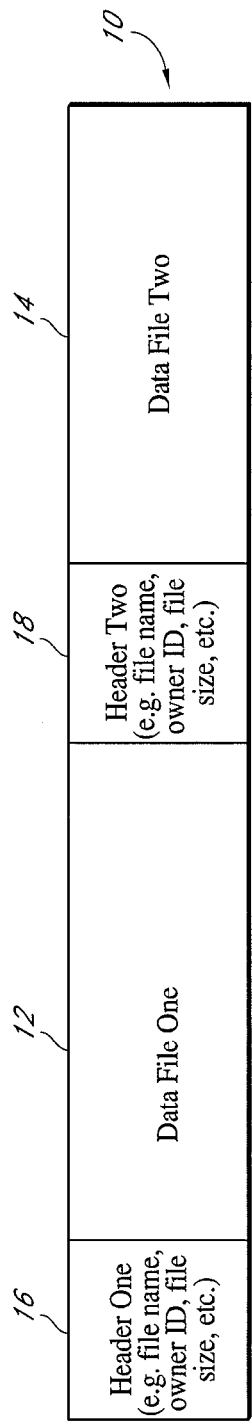
FIGS. 2A-E illustrate a method of intelligent decomposition and storage of content.

FIG. 2A shows one embodiment of an implementation of intelligent decomposition data management techniques with reference to a TAR archive 10 for a medical system storing, for example, cardiology and radiology images. Other embodiments utilize other data file types having known boundaries. The TAR archive 10 includes two archived files 12, 14. Each archived file 12, 14 is preceded by a header block 16, 18. The archived file data is written unaltered except that its length is rounded up to a multiple of 512 bytes and the extra space is zero filled. The TAR headers 16, 18 may comprise 512 byte blocks of data indicating the size of each data file, the owner and group ID, the last modification time, and other data.

Figure 2B:
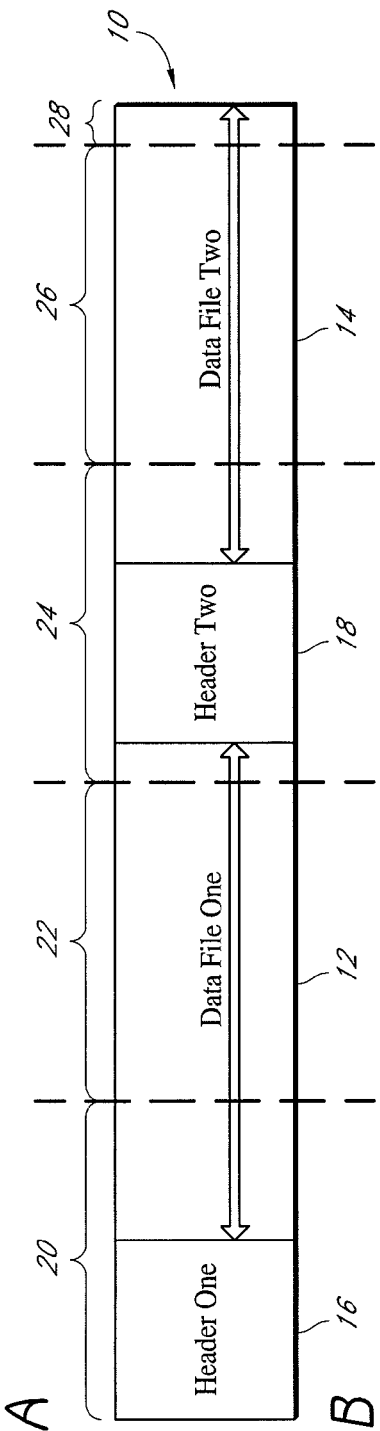

As discussed previously, objects such as a TAR archive may be stored in one or more packets. For example, FIG. 2B illustrates partitioning of the TAR archive 10 into five packets 20, 22, 24, 26, 28. The partitioning of the packets 20, 22, 24, 26, 28 was done without regard for the file boundaries within the TAR archive. Accordingly, the packets 20, 22, 24, 26, 28 contain data from various sources that may not be logically related. For example, the packet 24 contains data corresponding to file 12, header block 18, and file 14. There is no alignment of the TAR headers, and no references to data in external objects.

Figure 2C:
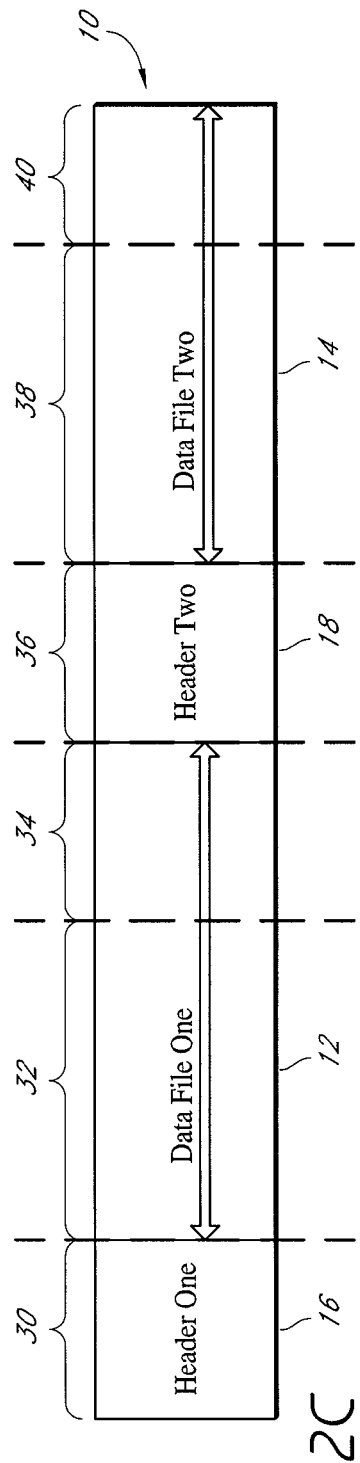

FIG. 2C illustrates the partitioning of the TAR archive 10 by using the file boundaries and the alignment of TAR headers. TAR header 16 is placed in packet 30, archived file 12 is placed in packets 32, 34, TAR header 18 is placed in packet 36, and archived file 14 is placed in packets 38, 40. Because the TAR archive 10 was partitioned along the TAR archive header and file boundaries, each of the TAR archive headers and files can be handled separately.

Figure 2D:
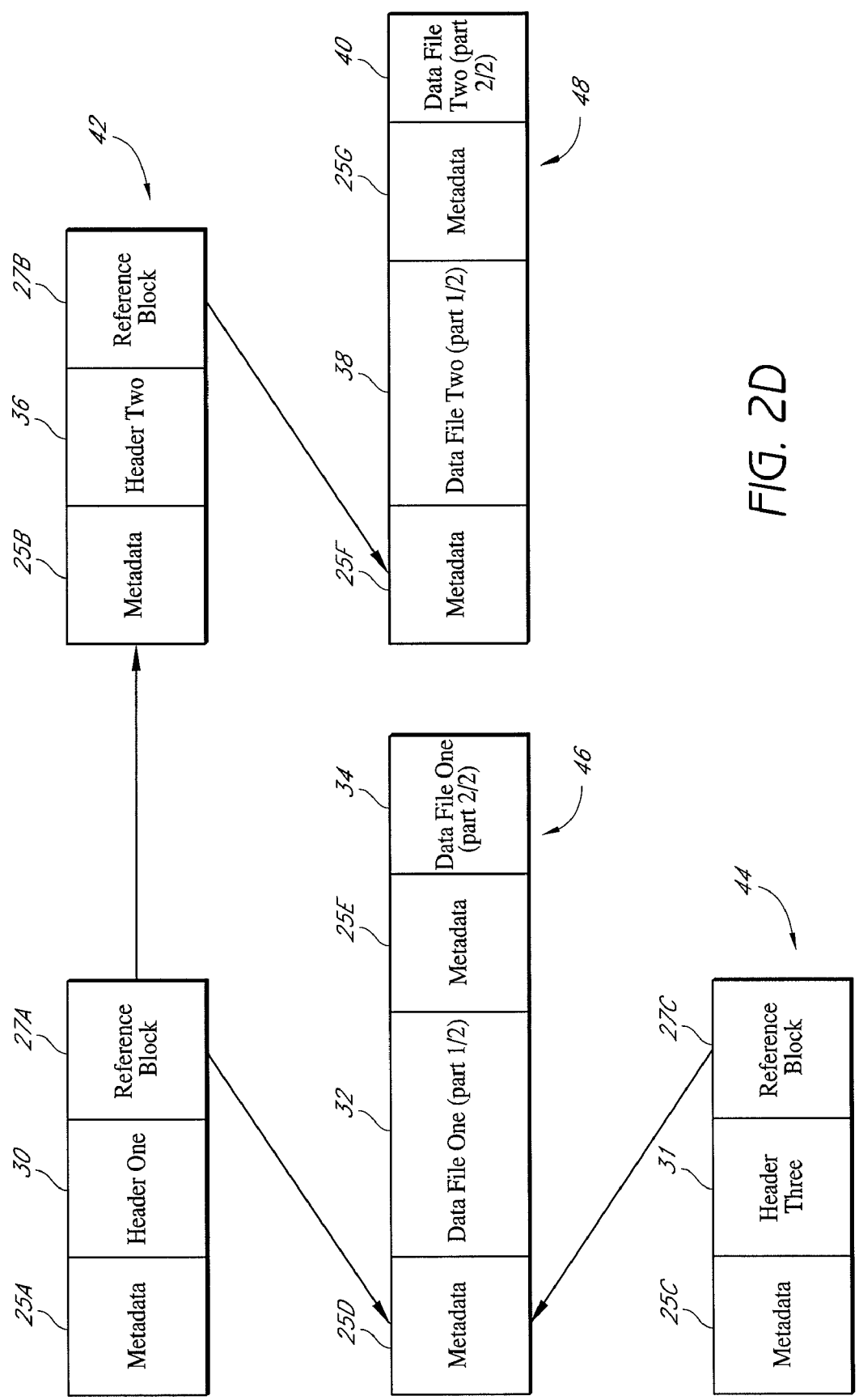

FIG. 2D illustrates an exemplary embodiment for storing the partitions from FIG. 2C as multiple objects. A master object 42 corresponds to the TAR archive 10. The master object 42 includes a component for each of the two files in the TAR archive. The first component includes metadata packet 25A, TAR file header packet 30 (from FIG. 2C), and reference block 27A. The second component includes metadata packet 25B, TAR file header packet 36 (from FIG. 2C), and reference block 27B.

Reference block 27A provides a reference to a reference object 46. Reference object 46 includes partitions 32, 34 corresponding to the first file 12 in the TAR archive 10, and packet metadata 25D and 25E. Reference block 27B provides a reference to a reference object 48. Reference object 48 includes partitions 38, 40 corresponding to the second file 14 in the TAR archive 10, and packet metadata 25F and 25G. Thus, each archived file 12, 14 is stored as a unique object and referenced by a master object.

FIG. 2D also includes a second master object 44. Master object 44 includes a packet 31 corresponding to a third header. In this example, the third header is found in a TAR archive that also contains the first data file 12. Rather than storing an additional reference object representing a duplicate copy of the reference object 46, the reference content block 27C references the existing stored reference object 46. By reducing the required storage of duplicate objects, the total amount of storage resources required by the fixed-content storage subsystem may be reduced.

Although the example shown in FIGS. 2A-2D relates to a TAR file, a similar procedure could be applied to other file types. In one example, a media file may contain a series of media clips, and each media clip could be treated as an object.

In another example, a pdf file may contain pages or other content that could be treated as separate objects.

Figure 2E:
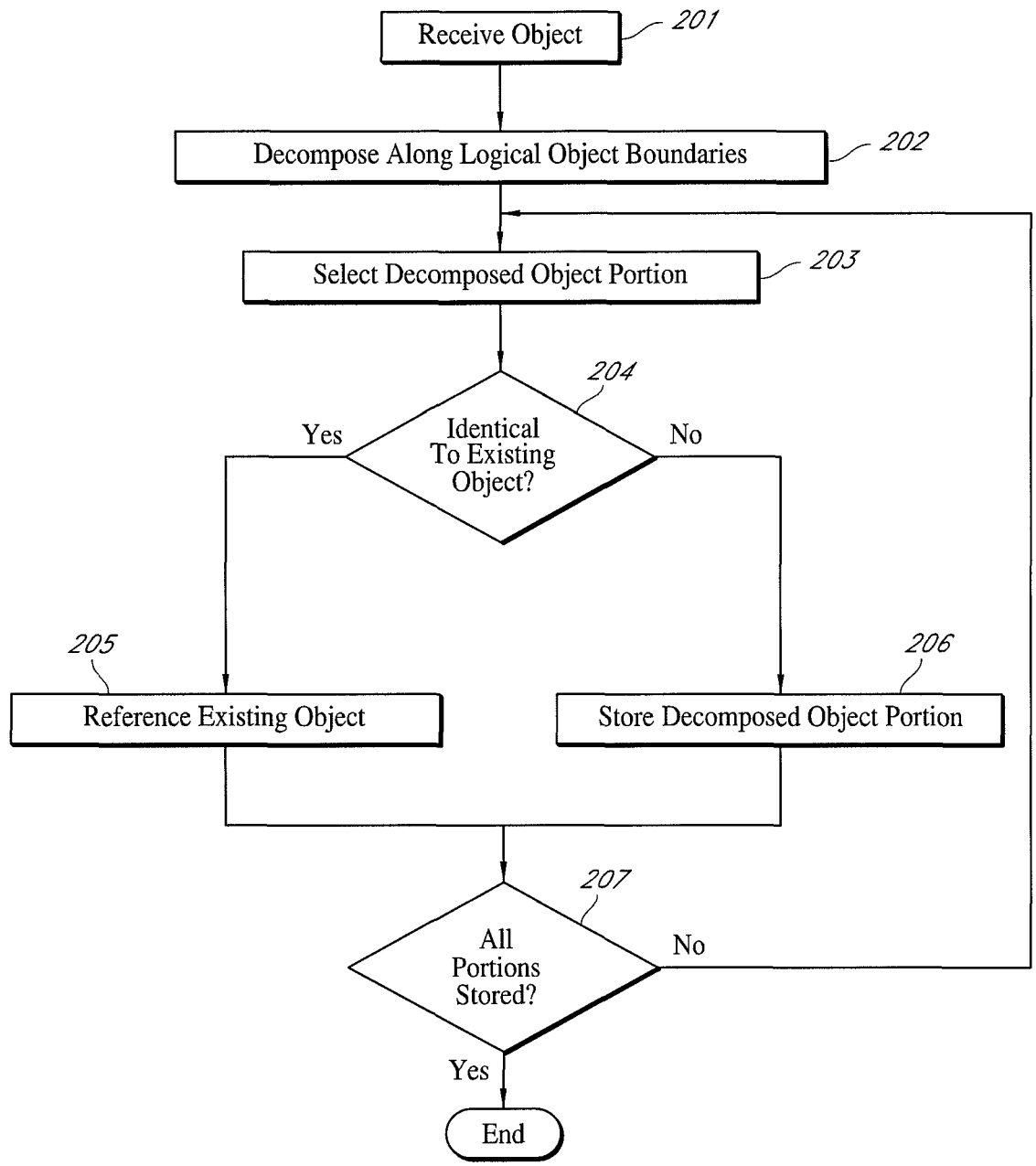

One embodiment of a process for intelligently decomposing objects stored to a fixed-content storage system is shown in FIG. 2E. The process begins at state 201 where an object to be stored is received. The object received is preferably of a type having a well known file structure so that it can be decomposed or packetized at state 202 along its logical boundaries. For example, header data may be separated from payload data.

The decomposed object is thus broken into separate portions, each of which may comprise one or more packets. One of the portions is selected at state 203, and at decision state 204 it is determined if the selected portion is identical to an existing stored reference object. The existing object may comprise any other object, but is likely to be a reference object related to the current object being stored. For example, if the current object being stored is an instance of a medical study, then existing instances of the study may be identified based on metadata or additional data from the external system providing the object. If the portion already exists as a reference object, then the existing object is referenced by a reference content block at state 205. If the portion does not already exist in the storage system, then the decomposed object portion is stored at state 206. At decision state 207 it is determined whether the entire received object has been stored or referenced. If any portion remains, then the process returns to state 203. When all portions have been handled, then a master object exists in the storage system for the received object that references existing data as well as any new data. Thus, this process may advantageously be used in a fixed-content storage system in order to allow greater flexibility and reduce the need for increased storage space.

In one embodiment, the decomposed object portion is stored prior to identification of existing instances of the object. After it is determined that equivalent content to the decomposed object portion is stored in another object, the identifier for the decomposed object portion may be repointed to the other object. The stored decomposed object portion may then be removed.

Object Consolidation

Figure 3A:
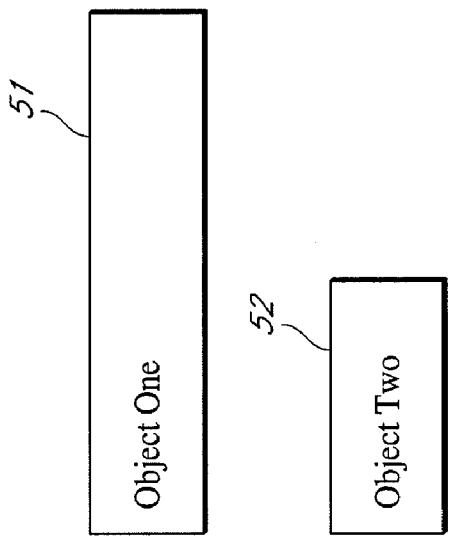
FIGS. 3A-C illustrate a method of object consolidation and storage of content.
Figure 3B:
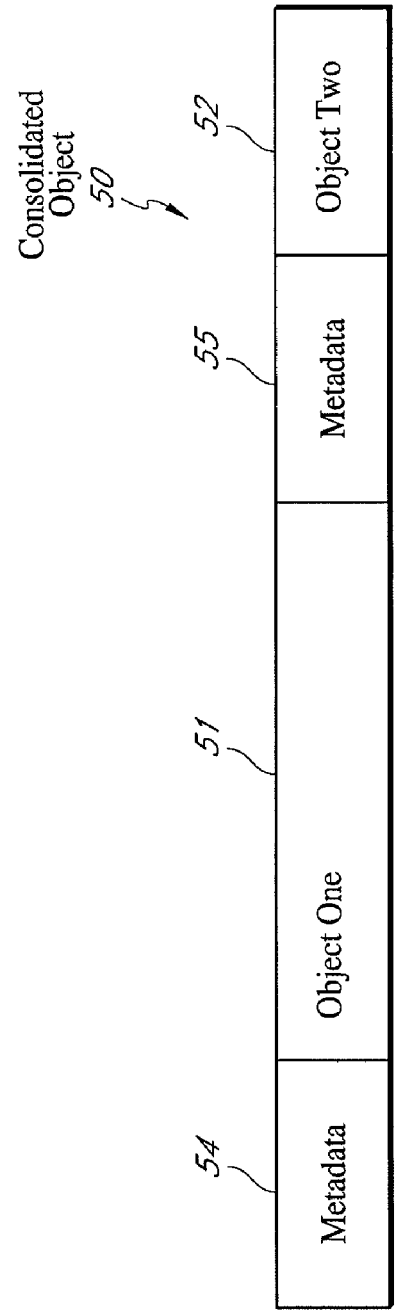
Figure 3C:
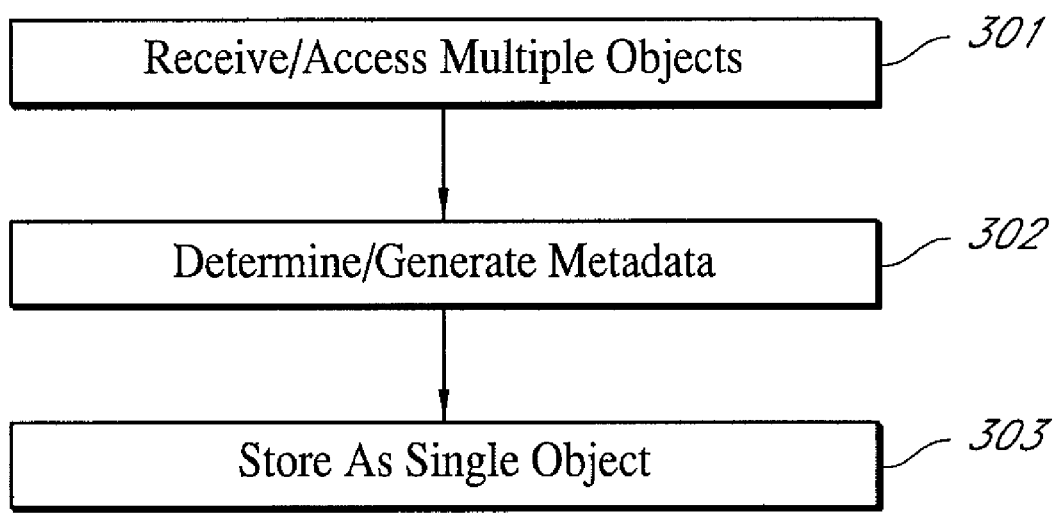

FIGS. 3A-C show a method of object consolidation for a fixed-content storage system. For multiple data objects representing individual instances of a particular group, it may be inefficient to store each instance as a separate object. Even when identical data is handled efficiently, the management of a large number of objects may create inefficiencies in object management.

As an example, a data object representing an advertisement is created for distribution and display in a variety of geographical areas. The advertisement data object may be configured to reference a large number of additional data objects (e.g., endings), with each of the additional data objects corresponding to one of the geographical areas. Rather than storing a separate data object including the advertisement data object for each additional data object or storing the advertisement data object once and storing each of the additional data objects separately, a single object may be created with each of the additional data objects stored back-to-back. When the advertisement object is accessed, a floating reference content block resolves to a different offset based on the geographic location. Thus, for 200 different regions, rather than storing a relatively large advertisement and 200 relatively short endings as 201 objects, the endings are stored back-to-back so that a single object is created including the advertisement and all of the endings. The cost of managing many small objects for different applications, sometimes having tens of thousands or more individual instances, can be quite large. Storing the small objects as a single object allows for random access retrieval while reducing the number of objects required, thus making storage management more cost effective.

As another example, a data object representing a medical study may include thousands of individual cases or instances. The cost of managing many small objects can be large from a licensing or hardware standpoint. Consolidating the cases or instances reduces the number of objects required. The individual cases or instances would still be accessible using offsets for random-access.

FIG. 3A shows an example of object consolidation of two external data objects 51 and 52 according to one embodiment. The external data objects 51 and 52 may be any type of data object, such as media files, medical storage files, or the like. For example, external data object 51 may represent a first file of a medical study to be stored, and external data object 52 may represent an additional instance of the study. In another embodiment, the external data objects 51 and 52 are files that were originally stored in the same folder.

Rather than store external data objects 51 and 52 as separate objects, they may be stored as a single consolidated data object 50 as shown in FIG. 3B. Data object 50 comprises metadata 54, 55 and external data objects 51 and 52. Metadata 54, 55 may indicate, for example, an offset and size of a particular section of an object. While the example shown in FIGS. 3A and 3B show only two external data objects consolidated to form data object 50, in some embodiments a different number of external data objects are consolidated. As the number of external objects increases, object consolidation as described herein provides additional efficiency in managing the objects in a fixed-content storage system.

FIG. 3C shows a process for creating a consolidated data object. At state 301 multiple objects are received or accessed. In some embodiments, these objects are accessed and consolidated from within a storage system. In some embodiments, multiple objects are received from an external computing system to be stored, and every object to be consolidated is received in a single data transfer. In some embodiments, one or more new objects to be consolidated with existing stored data are received.

At state 302, metadata is generated for the consolidated object that indicates an offset and size for the received data objects. For example, the metadata may indicate that a first data object stored in a consolidated data object may have no offset and be 64 KB, while the second data object may have a 64 KB offset and be 32 KB.

At state 303, the multiple received objects are stored back-to-back as a single object. Any reference to the multiple received objects can be handled by the consolidated object that will reference each of the received objects by offset. Accordingly, management of many related objects may be simplified and costs reduced because a smaller number of objects are stored in the storage system.

Differenced Objects

Because data in fixed-content storage systems is immutable, small changes made to large files may be handled inefficiently by traditional systems. For example, a large database containing approximately 50 GB of data is stored as an object in a fixed-content storage system. An edit to that database is made by a user that comprises approximately 100 KB of changed data. The originally stored object cannot be modified with these changes in the fixed-content storage system, as the stored data may not be edited. In traditional fixed-content storage systems, even though the vast majority of the data from the original object has not been changed, a new object must be stored including the more than 49 GB that remains identical.

Medical data may include an image and corresponding demographic data. The size of the image is much larger than the corresponding demographic data. Thus, a 50 MB image may be updated to write 32 bytes worth of patient name information.

Figure 4A:
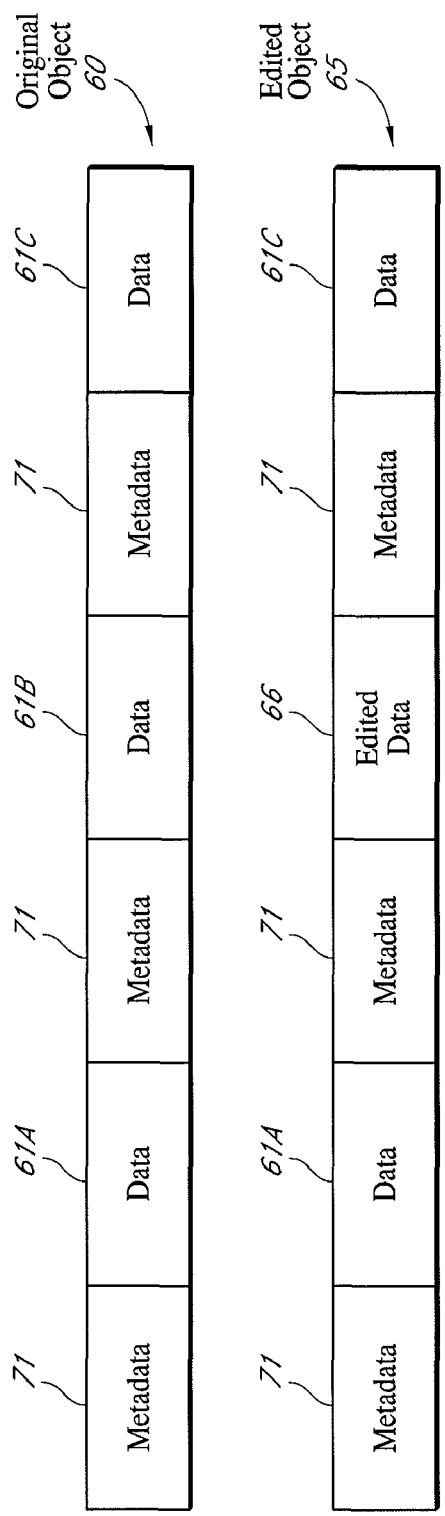
FIGS. 4A-C illustrate a method of storing content as a differenced object.
Figure 4B:
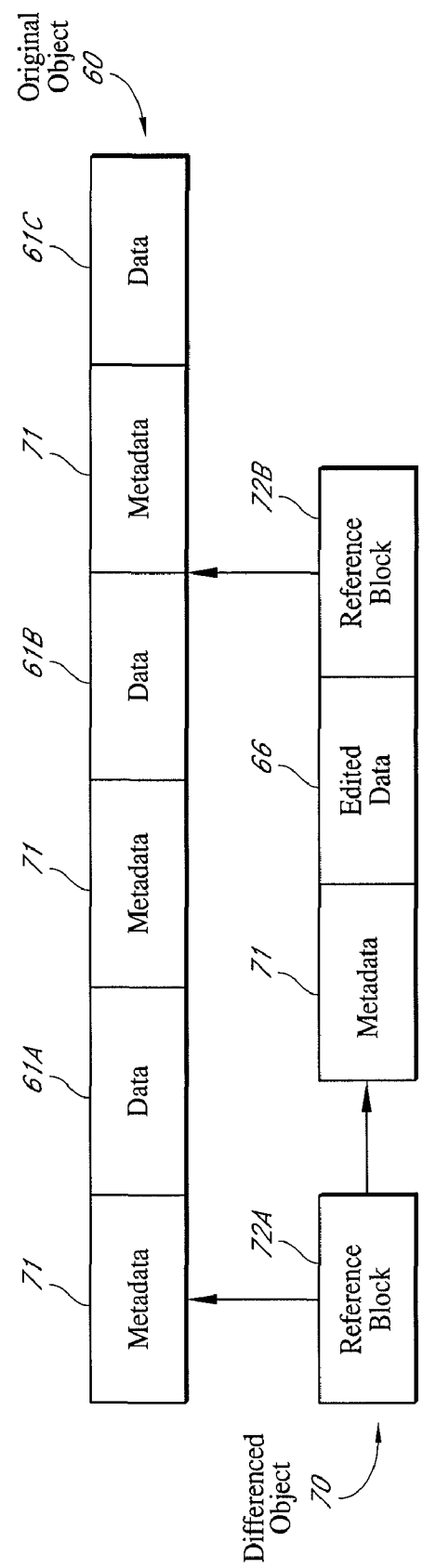
Figure 4C:
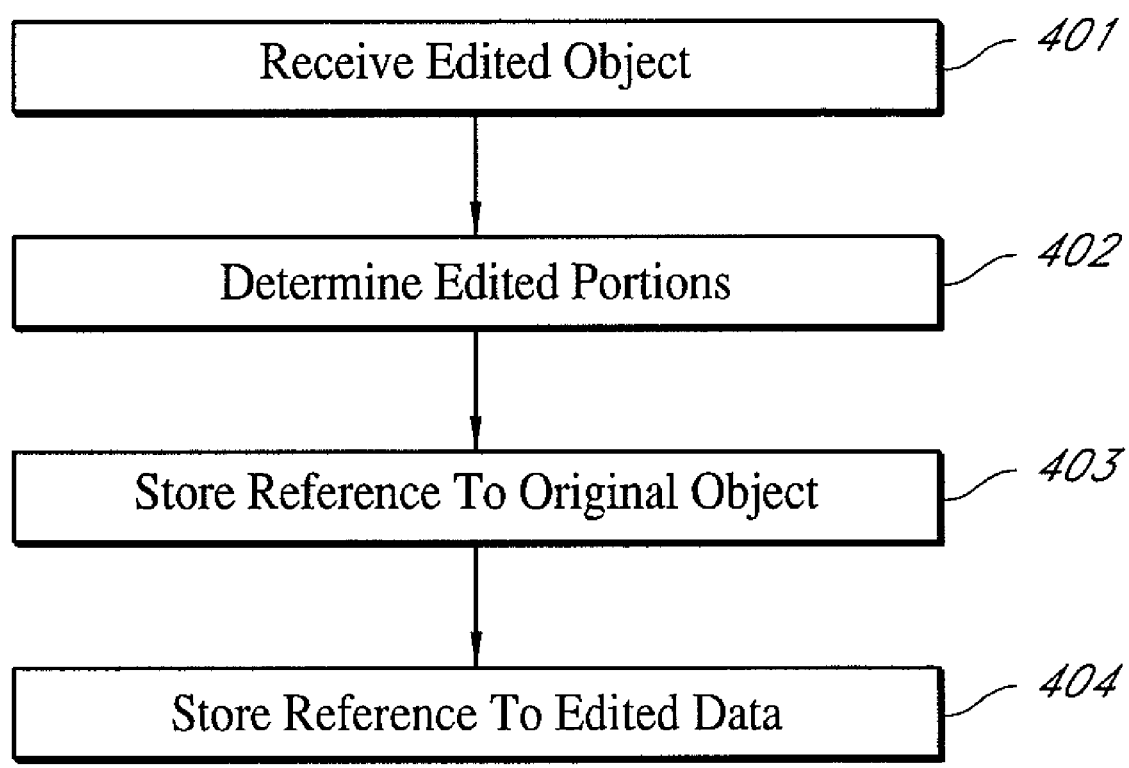

FIGS. 4A-C show an example of a method for generating and storing a differenced object in a fixed-content storage system to more efficiently handle such changes according to one embodiment. FIG. 4A shows an original data object 60 and an edited data object 65 as stored in a traditional fixed-content storage system. Original object 60 comprises metadata 71 and payload data 61A-C. For example, the original data object 60 may be a 50 MB radiology image along with a relatively small amount of associated data 61B that represents patient name, demographic data, and the like. The associated data 61B may represent, for example 32 bytes of 50 MB data object 60. When a change is made to the associated data 61B, a typical fixed-content system may store the edited object as a new data object 65 that includes most of the data from the original data object 60, but has replaced the associated data 61B with the edited data 66.

Rather than storing, as shown in FIG. 4A, the original object 60 and a separate object 65 containing the entire original object with the edited data 66, FIG. 4B shows a method for storing a differenced object including essentially only the changes. FIG. 5B shows original object 60 comprising packet metadata 71 and payload data 61A-C. An edit represented by data 66 has again been made to the associated data 61B representing a small portion of the original object 60. A differenced object 70 is created as the edited object. Differenced object 70 comprises reference content block 72A. Reference content block 72A references the original object 60 so that the data shared by the edited object 65 and the original object 60 may be accessed by differenced object 70 without storing additional copies of the data. Reference content block 72A further references an object including metadata 71, edited data 66, and reference content block 72B. The reference content block 72A and the reference content block 72B may indicate the location or offset where associated data 61B of the original object 60 is to be replaced by edited data 66 when the edited and differenced object 70 is accessed, the size of the edited data 66, the size of the associated data 61B, and the like. Referencing the identical data from the original object 60 allows original object 60 to be maintained as a fixed-content object, while small changes are efficiently stored to create additional instances of edited objects.

FIG. 4C is a flowchart indicating one embodiment of a process for generating a differenced object. At state 401, an edited object is received. Next, at state 402, the edited object is compared to the original object. In the example shown in FIGS. 4A and 4B, associated data 61B is shown as the payload data from one packet. However, in some embodiments edits may comprise only a portion of the payload data from a packet or may comprise multiple packets or portions thereof. Furthermore, although edited data 66 is shown in FIGS. 4A and 4B as containing the same quantity of data as the associated data 61B, this need not be the case. In some embodiments, the edited data may contain more or less data than the section of the original object it replaces.

In some embodiments, the fixed-content storage system is configured to determine whether to store a new object or create a differenced object based on the magnitude of the changes to the original object relative to the object's size. When the changes are larger than a threshold determined, for example, based on the size of the original object, the edited object is stored as a new object. When the changes are less than the determined threshold, then the edited object may be stored as a differenced object. For example, the threshold may be that the size of the edited data must not be larger than 50% of the size of original file.

After the edited portions have been determined (and are determined to be small relative to the original object in some embodiments), then at state 403 a reference is stored to the original data object that may include metadata indicating which portions and how much of the original object is utilized by the edited object. At state 404, a reference is stored to the edited data. Metadata may also be stored that indicates the positioning of the edited data within the original object.

In some embodiments, differenced objects may additionally be 'flattened' when the original object they reference is no longer necessary. The referenced data from the original object may be copied and stored in the differenced object with all of the changes, creating a new object. The original object may then be deleted.

Composite Objects

In order to realize certain advanced applications it may be desirable that several objects be grouped within a single container as a composite object. The objects may therefore be managed according to a single set of rules. For example, a medical study may contain a number of instances representing, for example, images captured as part of an examination. A user accessing the stored images may want to retrieve only one image of more than 500. If the user were forced to retrieve each image, a great deal of time and resources may be wasted. This may be accomplished using composite objects. For medical systems though, this is usually done using proprietary container files that are application-specific, or accomplished by using file-system directories as containers.

Figure 5A:
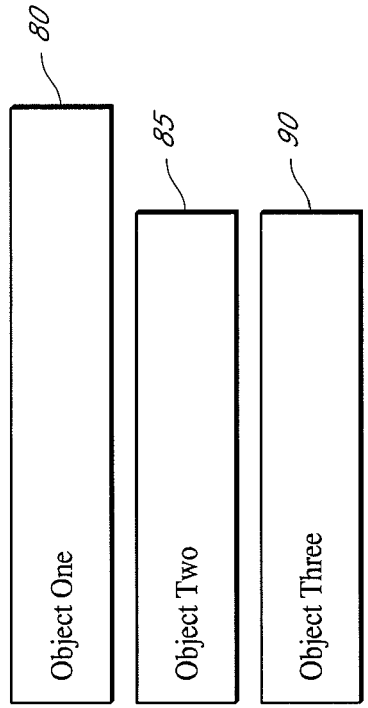
FIGS. 5A-C illustrate a method of storing content as a composite object.
Figure 5B:
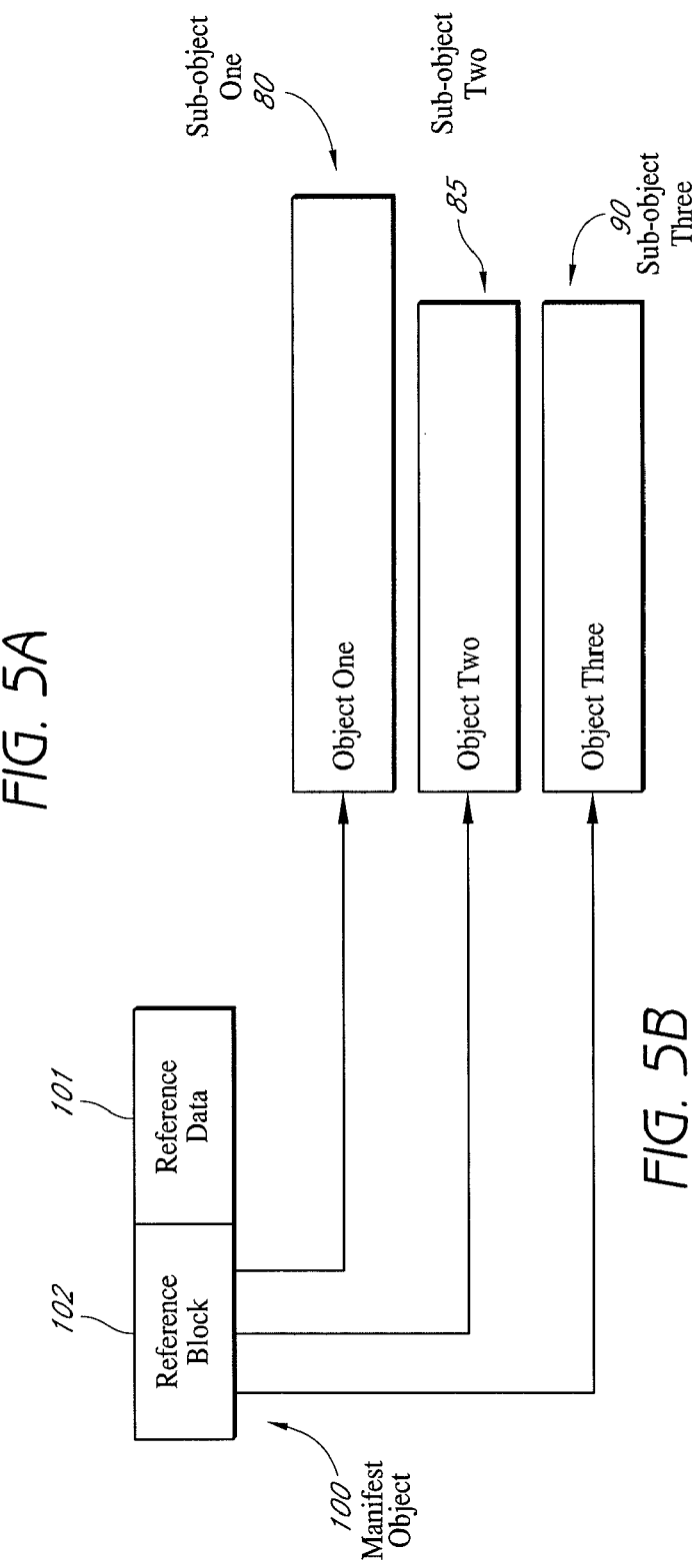
Figure 5C:
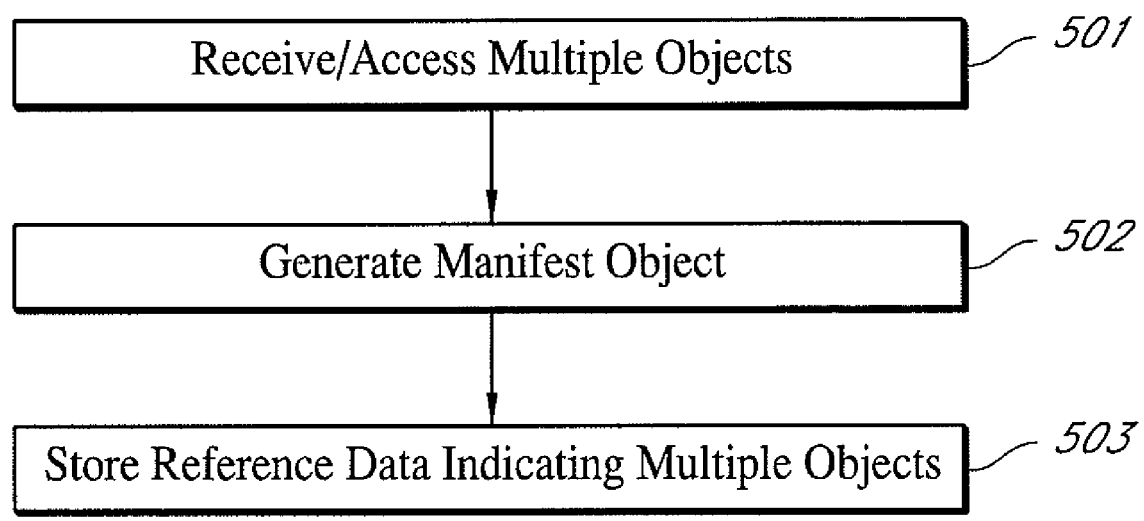

FIGS. 5A-C show an example of a method for storing composite objects in an object-oriented fixed-content storage system. FIG. 5A includes data objects 80, 85, and 90. In some embodiments, the contents of the data objects 80, 85, and 90 are related, but the objects represent different file types. In some embodiments, each data object used to form a composite object is of the same file type.

As shown in the embodiment of FIG. 5B, a manifest data object 100 is created in order to simplify the management of data objects 80, 85, and 90. Manifest data object 100 includes reference data 101, which references each sub-object 80, 85, and 90 in the composite object 100. In some embodiments, manifest data object 100 is compliant with certain standards such as XAM so that updated API commands access the manifest object. If data is changed, only the manifest and changed data need to be updated. Thus, composite objects described here provide a large degree of flexibility and increase data management capabilities.

In some embodiments, composite objects may be managed by a single set of rules, for example stored in the metadata 102 of manifest data object 100. In some embodiments, sub-objects referenced by the manifest data object 100 include a "managed as" field within the sub-object metadata that instructs the fixed-content storage system how to manage the given sub-object when it is desired that the object not be managed according to the manifest data object 100.

FIG. 5C shows an embodiment of a process for generating a composite object. At state 501, multiple objects that are to be related by the composite object are received or accessed. In some embodiments, multiple objects are received from an external computing system to be stored substantially simultaneously as a composite object. In some embodiments, multiple objects already stored in the fixed-content storage system are accessed in order to generate a composite object.

At state 502, a manifest object is generated. At state 503, reference data indicating the multiple objects received or accessed at state 501 is stored in the manifest object.

In a preferred embodiment, the reference data is stored as content data, rather than a metadata reference content block, in order to prevent the alteration of the manifest object in the storage system. In some embodiments, one or more reference content blocks are utilized.

Figure 6:
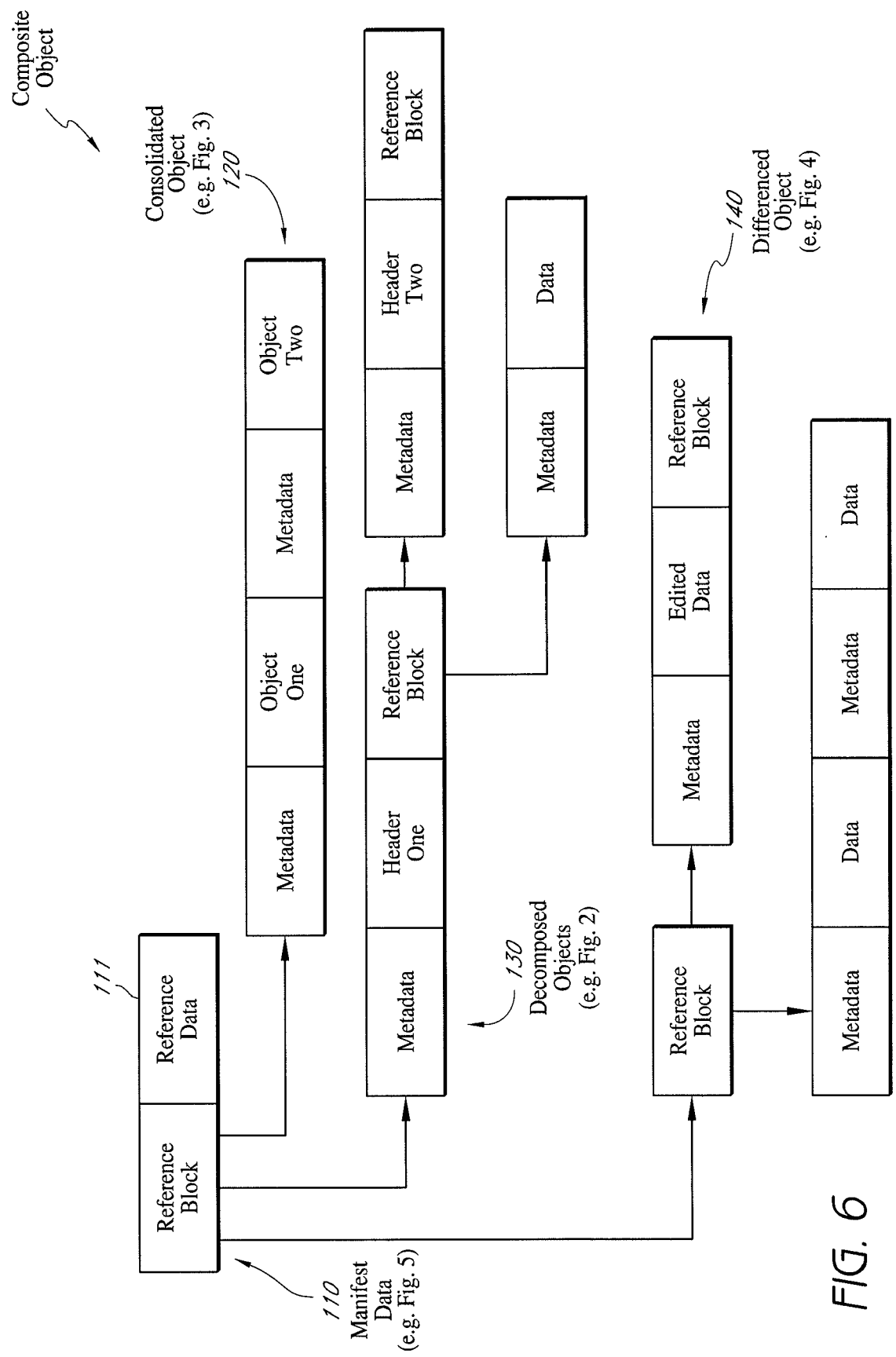
FIG. 6 illustrates a composite object utilizing various storage methods.

FIG. 6 demonstrates a composite object referencing several data objects using many of the data management techniques discussed herein. In the embodiment shown, manifest data object 110 references consolidated object 120, differenced object 140, and intelligently decomposed object 130. A skilled artisan will realize that these storage management systems and methods may be combined in a variety of ways without departing from the scope of the invention.

The high-level overview illustrated in the figures partitions the functionality of the overall system into modules for ease of explanation. It is to be understood, however, that one or more modules may operate as a single unit. Conversely, a single module may comprise one or more subcomponents that are distributed throughout one or more locations. Further, the communication between the modules may occur in a variety of ways, such as hardware implementations, software implementation, or a combination of hardware and software. Further, the modules may be realized using state machines, microcode, microprocessors, digital signal processors, or any other appropriate digital or analog technology.

It should be understood that the methods and systems described herein may be implemented in a variety of ways. Methods described herein may utilize other steps or omit certain steps. Other embodiments that are apparent to those of ordinary skill in the art, including embodiments which do not provide all of the benefits and features set forth herein, are also within the scope of the invention. For example, intelligent decomposition may be used to store objects even where multiple copies of objects are required according to lifecycle management policies or regulations. While some of the embodiments described herein provide specific details for implementation, the scope of the disclosure is intended to be broad and not limited to the specific embodiments described. Accordingly, details described in the specification should not be construed as limitations of the claimed invention. Rather, the scope of the claims should be ascertained from the language of the claims, which use terms consistent with their plain and ordinary meaning.

The invention claimed is:

1. A method of storing immutable data objects in a computer readable storage, the method comprising:
receiving a first original immutable data object comprising data having a plurality of parts;
determining at least one logical boundary that divides the plurality of parts within the first original object;
storing in a fixed content storage system at least one of the divided parts of the first original object as a first part object, wherein the first part object is allocated an identifier;
storing in the fixed content storage system a first master object comprising metadata that includes the allocated identifier to reference the first part object of the first original object;
receiving a second original immutable data object comprising data having a plurality of parts;
determining at least one logical boundary that divides the plurality of parts within the second original object;
storing in a fixed content storage system at least one of the divided parts of the second original object as a second part object, wherein the second part object of the second original object is allocated an identifier;
storing in the fixed content storage system a second master object comprising metadata that includes the allocated identifier to reference the second part object of the second original object;
determining the first part object referenced by the first master object has equivalent content to the second part object referenced by the second master object;
repointing the allocated identifier of the second part object to point to the first part object of the first original object, and
removing the second part object of the second original object.

2. The method of claim 1, wherein the first original object and the second original object comprise TAR files, the part objects correspond to TAR data parts, and wherein the equivalent part objects correspond to identical TAR data parts.

3. The method of claim 1, wherein a plurality of the divided parts of the first original object are stored as part objects, and the first master object comprises metadata that includes allocated identifiers to reference each of the stored part objects.

4. The method of claim 3, further comprising:
determining at least one of the stored part objects referenced by the first master object has equivalent contents to at least one of the other stored part objects referenced by the first master object;
repointing allocated identifiers of the stored part objects that have equivalent content to point to one of the equivalent stored part objects, and
removing stored part objects with no identifiers pointing to them.

5. The method of claim 1, wherein at least one of the divided parts of the first original object is stored as a part object, with the remainder of the divided parts being stored in the master object.

6. A system configured to store immutable data objects in a computer-readable storage, the system comprising:
a fixed content storage system comprising one or more storage devices; and
one or more processors in communication with the fixed-content storage system, the processors configured with executable instructions to perform a method comprising:
receiving a first original immutable data object comprising data having a plurality of parts;
determining at least one logical boundary that divides the plurality of parts within the first original object;
storing in the fixed content storage system at least one of the divided parts of the first original object as a first part object, wherein the first part object is allocated a first identifier;
storing in the fixed content storage system a first master object comprising metadata based at least in part on the first identifier;
receiving a second original immutable data object comprising data having a plurality of parts;
determining at least one logical boundary that divides the plurality of parts within the second original object;
determining that a second part object has equivalent content to the second part object, the second part object comprising at least one of the divided parts of the second original objects; and storing in the fixed content storage system a second master object comprising metadata based at least in part on the first identifier, whereby the fixed content storage system need not duplicatively store the second part object.

7. The system of claim 6, wherein the first original object and the second original object comprise TAR files, the part objects correspond to TAR data parts, and wherein the equivalent part objects correspond to identical TAR data parts.

8. The system of claim 6, wherein a plurality of the divided parts of the first original object are stored as part objects, and the first master object comprises metadata that includes allocated identifiers to reference each of the stored part objects.

9. The system of claim 8, wherein the method further comprises:
    determining at least one of the stored part objects referenced by the first master object has equivalent contents to at least one of the other stored part objects referenced by the first master object;
    repointing allocated identifiers of the stored part objects that have equivalent content to point to one of the equivalent stored part objects, and
    removing stored part objects with no identifiers pointing to them.

10. The system of claim 6, wherein at least one of the divided parts of the first original object is stored as a part object, with the remainder of the divided parts being stored in the master object.

11. A system of storing objects within a fixed content storage system, the system being configured to avoid storing duplicative content between multiple objects having equivalent parts, the system comprising:
    a fixed content storage system comprising a distributed network of computing nodes, the computing nodes comprising one or more storage devices; and
    one or more processors present at one or more of the computing nodes, the processors configured with executable instructions to perform a method comprising:
        receiving a first object comprising data having a plurality of parts divided by one or more logical boundaries;
        storing first metadata in the fixed content storage system, the first metadata comprising a reference to a first part object stored in the fixed content storage system, the first part object comprising one or more of the plurality of parts of the first object;
        receiving a second object comprising data having a plurality of parts divided by one or more logical boundaries;
        determining whether a second part object is equivalent to the first part object, the second part object comprising one or more of the plurality of parts of the second object; and
        storing second metadata in the fixed content storage system, the second metadata comprising a reference to the part object if the second part object is equivalent, or a reference to the second part object if the second part object is not equivalent, the second part object being stored in the fixed content storage system if the second part object is not equivalent.

12. The method of claim 11, wherein the method further comprises storing the first part object in the fixed content storage system.

13. The method of claim 11, wherein the method further comprises storing, in the fixed content storage system, data comprising the second part object, prior to the determination that the second part object is equivalent to the first part object.

14. The method of claim 12, wherein the method further comprises deleting, from the fixed content storage system, data comprising the second part object, based on the determination that the second part object is equivalent to the first part object.

15. The method of claim 11, wherein storing the first metadata in the fixed content storage system comprises storing a first master object comprising the first metadata, and wherein storing the second metadata in the fixed content storage system comprises storing a second master object comprising the second metadata.

16. The method of claim 11, wherein the processor is further configured to repeat the step of determining whether a second part object is equivalent to the first part object, for all of the parts of the second object.

* * * * *